Sept. 25, 1945.  L. T. FREEMAN ET AL  2,385,621
BRAKE OPERATING MECHANISM
Filed July 27, 1943  2 Sheets-Sheet 1

INVENTOR
LEON T. FREEMAN
ROY H. SHIVELY
BY
Emery, Varney, Whittemore & Dix
ATTORNEYS Sept. 25, 1945. L. T. FREEMAN ET AL 2,385,621
BRAKE OPERATING MECHANISM
Filed July 27, 1943 2 Sheets-Sheet 2
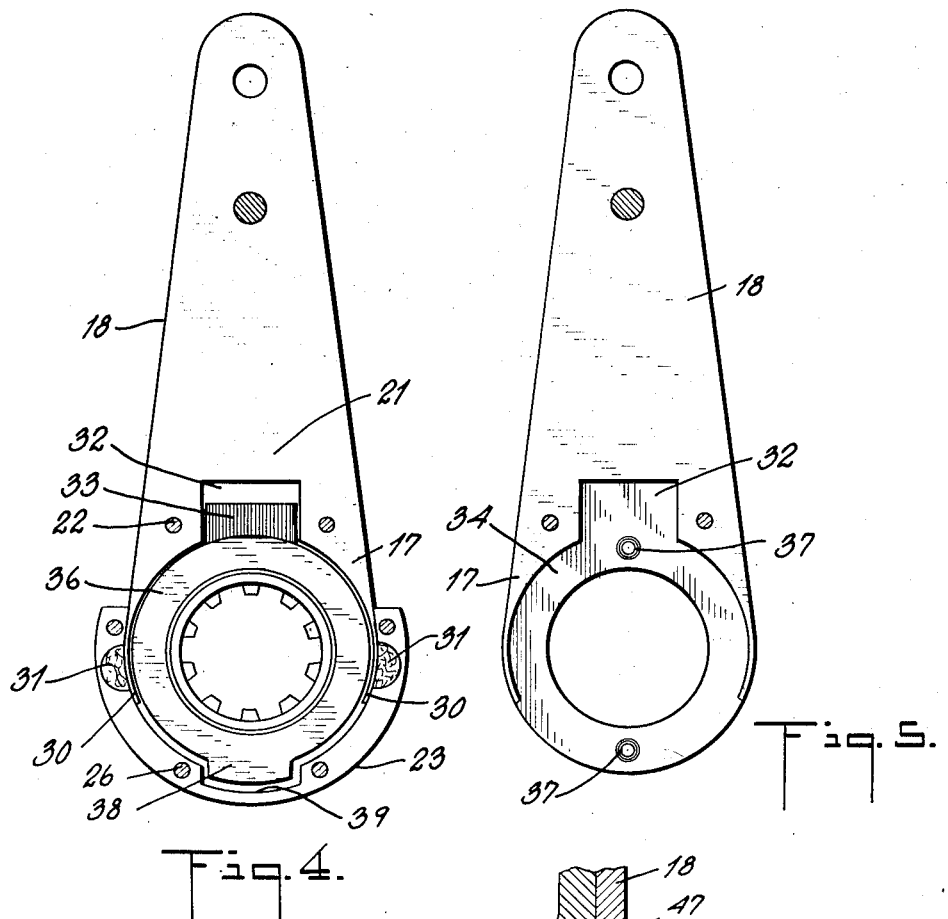
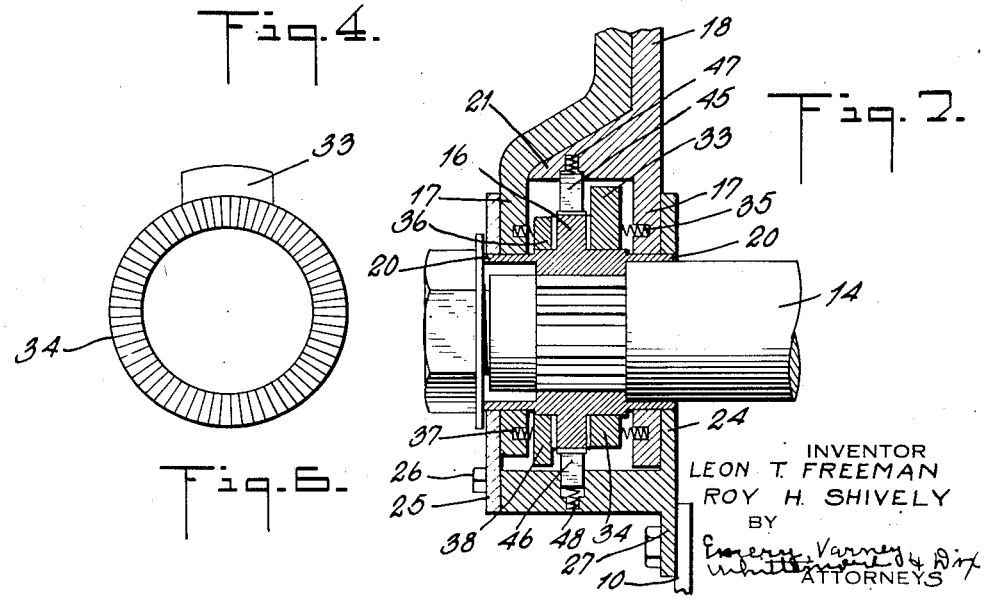
INVENTOR
LEON T. FREEMAN
ROY H. SHIVELY
BY
ATTORNEYS Patented Sept. 25, 1945

2,385,621

UNITED STATES PATENT OFFICE 2,385,621

BRAKE OPERATING MECHANISM

Leon T. Freeman and Roy H. Shively, Scranton, Pa.; said Freeman assignor to said Shively Application July 27, 1943, Serial No. 496,292

10 Claims. (Cl. 188—196)

This invention relates to brake operating mechanism and has for an object the provision of improvements in this art.

One of the principal objects of the invention is the provision of a dependable and inexpensive device for automatically maintaining brakes in properly adjusted condition. Another object is the provision of a brake adjusting device which occupies only a small radial space about the cam shaft or other operated element with which it is mounted. Another object is the provision of automatic brake adjusting means which can be readily substituted for standard manually adjusted brake operating means. Another object is the provision of brake adjusting means which is readily reversible so that it may be applied to either right hand or left hand equipment. Another object is the provision of improved details of construction.

The enumerated and other objects of the invention will be apparent from the following description of an exemplary embodiment of the invention, reference being made to the accompanying drawings thereof wherein:

Fig. 4 is an end elevation, partly in section, taken about on the line 4—4 of Fig. 2;

Fig. 5 is an elevation of the adjustment arm;

Fig. 6 is an elevation of an actuating pawl; and

Fig. 7 is an axial section similar to Fig. 2 but showing a form in which circumferential as well as axial end pawls are used.

Figure 1:
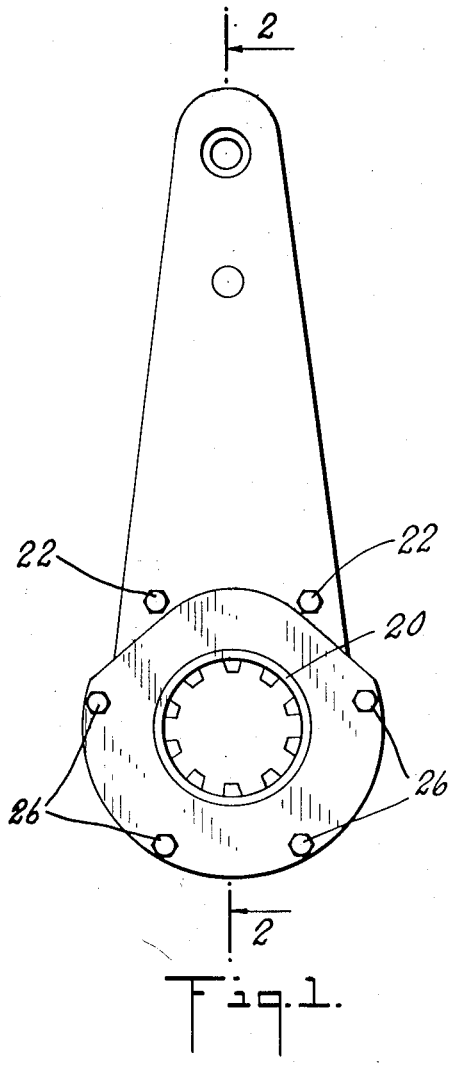
Fig. 1 is an end elevation of a brake adjusting device embodying the present invention, the brake drum, cam shaft, and arm operating device being omitted for simplification.
Figure 2:
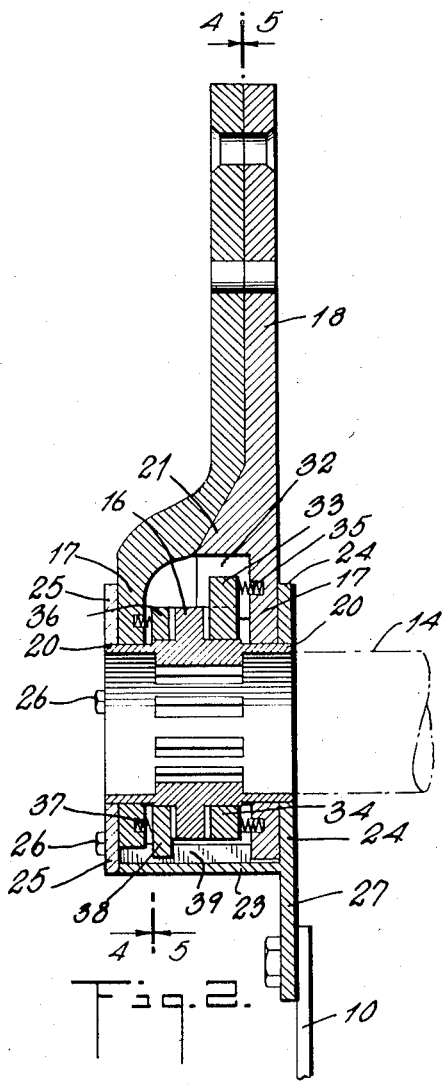
Fig. 2 is an axial section taken on the line 2—2 of Fig. 1.
Figure 3:
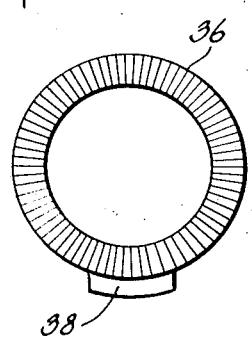
Fig. 3 is an elevation of a holding or adjustment pawl.

In the application of Leon T. Freeman and Roy H. Shively, Serial No. 460,336, filed October 1, 1942, Patent 2,379,796, issued July 3, 1945, there is disclosed an automatic brake adjustment device in which the operating and adjustment pawls are mounted around the circumference of a ratchet gear. The present invention provides operating and adjustment pawls which are mounted adjacent the end faces of the ratchet gear; and in some cases, as for heavy vehicles, it provides both circumferential ratchets as in the said application and axial ratchets adjacent the end faces of the ratchet gear.

The standard equipment of a vehicle includes a brake drum and cover, brake shoes, shoe spreaders such as cams, shoe contractors such as springs, a cam shaft (indicated in dot-and-dash lines herein as 14), a cam arm operating rod, and means such as a hand lever or power devices for actuating the rod. These details are well known and need not be particularly illustrated.

The device with which the present invention is more particularly concerned comprises a ratchet gear 16 which is splined interiorly and placed on the splined end of the cam shaft 14. On the sides of the ratchet gear, but spaced axially therefrom, there are disposed the bifurcated ends 17 of an operating arm 18. The outer end of the arm is connected, in the manner of the usual arm which it displaces, to the brake operating rod, not shown.

The inner ends 17 of the arm 18 have circular bearing openings so as to be free to turn about the axis of the shaft. In the present embodiment the ratchet gear 16 is provided with annular hub extensions 20 and the openings in the inner ends of the arm have a close turning fit on these extensions. The inner ends of the arm above the ratchet gear are spaced apart, as by an integral thickened portion 21 on one of the axially divided parts which form the arm, and the other arm is laterally offset at its inner end from above the spacer downward to its apertured end portion 17. The apertured inner ends 17 of the arm are parallel and the outer ends are parallel, juxtaposed, and secured together by screws 22. This permits assembly over the hub extensions of the ratchet gear. The outer end of the arm may be aligned with one of its spaced inner ends, the one nearest the brake drum as shown.

A casing encloses the ratchet gear and the inner ends of the arm, the casing here comprising a bottom shell 23, and end plates 24, 25 which are secured thereto in appropriate manner, as by screws 26. The end plates are provided with circular openings which closely embrace with a turning fit the hub extensions 20 of the ratchet gear.

The inner plate 24 which is located adjacent the brake drum is provided with a projection 27 by which the casing is anchored in a fixed position to the brake drum cover 10 or some other convenient fixed support. The particular support selected will depend upon the type of vehicle being equipped.

On the sides (Fig. 4) the arm is provided with extensions 30 which fit within the casing and cooperate with packing 31 to seal the space within.

The arm is provided with an inwardly opening recess 32 on one side to house the projection 33 of a plate actuating pawl 34 which is rotatably mounted on the hub extensions 20 of the ratchet gear. Springs 35 mounted in sockets between the plate pawl 34 and the inner end 17 of the arm 18 keep the pawl pressed against the ratchet tooth bearing end of the ratchet gear 16. There are cooperating teeth completely around the axis of both the ratchet and pawl and by having such a large number of teeth in mutual engagement full assurance of proper action is provided, even when the braking action is heavy.

The other end of the ratchet gear 16 is similarly provided with ratchet teeth extending completely about its axis and juxtaposed to these teeth are the mating teeth of an adjustment pawl plate 36 which is rotatable relatively upon the gear hub 20. The gear plate 36 is pressed axially toward the ratchet gear 16 by springs 37 disposed in sockets between the plate and the other inner end 17 of the arm 18. The plate is provided with a projection 38 which fits in an oversized slot 39 in the casing part 23. Some circumferential play is thus provided. The pressure of the springs and the slope of the teeth urge the plate to follow the ratchet gear in both directions of movement in applying and releasing the brakes each time. When the brakes become worn and the movement is greater than the permissible movement of the plate extension 38 in the slot 39 the teeth of the plate pass one step to the next set of teeth in the gear, thus taking up on the brake automatically. The slot 39 is long enough axially to permit the plate extension to be slipped in or removed.

The slack movement of the projection 38 in the slot 39 furnishes a certain minimum amount of free movement or backlash which insures that the brake bands will not be locked in braking position after the ratchet gear has been advanced a notch.

A pointer may be secured on the ratchet gear hub or on the cam shaft to indicate by reference to an adjacent fixed scale, as on the casing, the adjustment status at any particular time.

In Fig. 7 a modification is shown. Here the end plate pawls are the same as before and all similar parts are indicated by the same reference characters; but in addition the circumference of the ratchet gear 16 is provided with ratchet teeth which cooperate with circumferential actuating pawls 45 and a circumferential adjustment or holding pawl 46. The pawls 45 are mounted in a recess in the arm 18 and are pressed by springs 47; whereas the pawl 46 is mounted in a recess in the casing and is pressed by a spring 48 and has circumferential backlash as in the application referred to and as does the plate pawl 38 herein. In this view the cam shaft 14 and the means for securing it to the ratchet gear are fully illustrated. They would be the same for the first modification.

It is believed that the operation and advantages of the device will be apparent from the illustration and description without further amplification. And while certain forms of the invention have been specifically illustrated and described it is to be understood that the invention may have various embodiments within the limits of the prior art and the scope of the subjoined claims.

We claim:

1. Brake operating mechanism comprising in combination, a cam operating shaft, a ratchet gear secured on said shaft, a fixed cylindrical casing including an arcuate casing shell open at the top and circular end plates secured to the shell, an operating arm having bifurcated inner ends turnably mounted about the axis of said shaft, said arm ends being arcuate to fit the interior surface of the shell and being disposed against the end plates of the casing, projections on the sides of the arms between the bifurcated inner ends having a sealing working fit with the top sides of the open casing shell, said ratchet gear having hub ends extending through said arm ends and said casing plates with a turning fit, said ratchet gear having ratchet teeth on both end faces, an operating ring pawl mounted on one of said hubs and having teeth for cooperating with the ratchet teeth on one end, a projection acting between said operating ring pawl and said arm so the operating pawl turns back and forth with the arm, springs between said operating ring pawl and an inner end of said arm urging the pawl teeth against the ratchet gear teeth, an adjustment ring pawl mounted on the other hub and having teeth for cooperating with the ratchet teeth on one end, a projection acting between said adjustment ring pawl and said casing so the adjustment pawl is held to said casing, and springs between said adjustment ring pawl and an inner end of said arm urging the pawl teeth against the ratchet gear teeth.

2. Brake operating mechanism comprising in combination, a cam operating shaft, an axially fixed ratchet gear secured on said shaft, said ratchet gear having ratchet teeth on each end face, an operating arm having axially fixed bifurcated inner ends turnable about the axis of said shaft and ratchet gear, an axially slidable operating ring pawl and an axially slidable adjustment ring pawl disposed between the opposite ends of said ratchet gear and the inner ends of said arm, springs between said pawls and said arm ends urging the pawl teeth against said ratchet teeth, means securing said operating pawl to move with said arm, a fixed casing element forming with said arm and parts carried thereby an enclosing casing for the pawls and gear carried between the arm ends, and means connecting the adjustment pawl to the fixed casing element.

3. Brake operating mechanism comprising in combination, a cam operating shaft, an axially fixed ratchet gear secured on said shaft, said ratchet gear having ratchet teeth on each end face, an operating arm having axially fixed bifurcated inner ends turnable about the axis of said shaft and ratchet gear, an axially slidable operating ring pawl and an axially slidable adjustment ring pawl disposed between the opposite ends of said ratchet gear and the inner ends of said arm, springs between said pawls and said arm ends urging the pawl teeth against said ratchet teeth, means securing said operating pawl to move with said arm, a fixed casing element forming with said arm and parts carried thereby an enclosing casing for the pawls and gear carried between the arm ends and means connecting the adjustment pawl to the fixed casing element, said connection providing a small amount of back movement for said adjustment pawl to prevent locking the brakes when operated.

4. Brake operating mechanism comprising in combination, a cam operating shaft, a ratchet gear secured on said shaft, said ratchet gear having ratchet teeth on each end face, an operating arm turnable about the axis of said shaft and gear, an operating pawl and an adjustment pawl having teeth for cooperating with the teeth on said ratchet gear, means urging said pawl teeth against the ratchet gear teeth, means connecting said operating pawl for movement with said arm, said operating pawl having axial movement relative to the arm, a fixed element, and means connecting the adjustment pawl with restricted free movement to the fixed element.

5. Brake operating mechanism comprising in combination, a cam operating shaft, a ratchet gear secured on said shaft, said ratchet gear having ratchet teeth on each end face, an operating arm having spaced inner ends turnable about the axis of said shaft and gear, an operating pawl and an adjustment pawl between the arm ends and the gear having teeth for cooperating with the teeth on said ratchet gear, means urging said pawl teeth against the ratchet gear teeth, means connecting said operating pawl for movement with said arm, said operating and adjustment pawls each having axial movement relative to an arm end, a fixed element, and means connecting the adjustment pawl with restricted free movement to the fixed element.

6. Brake operating mechanism comprising in combination, a cam operating shaft, a ratchet gear secured on said shaft, said ratchet gear having ratchet teeth on its circumference and on each end face, an operating arm turnable about the axis of said shaft and gear, operating pawl means having teeth for cooperating with the circumferential teeth and the teeth on one end of said ratchet gear, adjustment pawl means having teeth for cooperating with the circumferential teeth and the teeth on the other end of said ratchet gear, means resiliently urging said pawl teeth against said ratchet gear teeth, means connecting said operating pawl means for movement with said operating arm, a fixed element, and means connecting the adjustment pawl means to the fixed element.

7. Brake operating mechanism as set forth in claim 6, further characterized by the fact that the operating pawl means includes a splined connection with said arm, and said adjustment pawl means includes a splined connection with the fixed element.

8. Brake operating mechanism comprising in combination, a cam operating shaft, a ratchet gear secured on said shaft, said ratchet gear having ratchet teeth on its circumference and on each end face, an operating arm turnable about the axis of said shaft and gear, operating pawl means having teeth for cooperating with the circumferential teeth and the teeth on one end of said ratchet gear, adjustment pawl means having teeth for cooperating with the circumferential teeth and the teeth on the other end of said ratchet gear, means resiliently urging said pawl teeth against said ratchet gear teeth, means connecting said operating pawl means for movement with said operating arm, a fixed element, and means connecting the adjustment pawl means to the fixed element, said adjustment pawl means providing a small amount of back movement for said adjustment pawl to prevent locking the brakes when operated.

9. Brake operating mechanism as set forth in claim 6 further characterized by the fact that the operating and adjustment pawl means include ring pawls relative to which the ratchet gear is movable on the shaft axis.

10. Brake operating mechanism as set forth in claim 6 further characterized by the fact that the ratchet gear has opposite end hubs upon which the operating arm and ring pawls are mounted for relative turning movement.

LEON T. FREEMAN.
ROY H. SHIVELY.